(12) United States Patent
Moore

(10) Patent No.: US 6,817,644 B2
(45) Date of Patent: Nov. 16, 2004

(54) LOAD RETAINING BARRIER NET FOR MOTOR VEHICLE

(75) Inventor: Donal Moore, Birmingham, MI (US)

(73) Assignee: Exco Automotive Solutions, L.P., Troy, MI (US)

( * ) Notice: Subject to any disclaimer, the term of this patent is extended or adjusted under 35 U.S.C. 154(b) by 9 days.

(21) Appl. No.: 10/102,141

(22) Filed: Mar. 20, 2002

(65) Prior Publication Data

US 2002/0096900 A1 Jul. 25, 2002

Related U.S. Application Data

(60) Division of application No. 09/612,062, filed on Jul. 7, 2000, now Pat. No. 6,554,339, and a division of application No. 08/979,603, filed on Nov. 26, 1997, now Pat. No. 6,099,222, and a continuation-in-part of application No. 08/979,603, filed on Nov. 26, 1997, now Pat. No. 6,099,222, which is a continuation-in-part of application No. 08/561,926, filed on Nov. 22, 1995, now Pat. No. 5,772,370.

(60) Provisional application No. 60/142,782, filed on Jul. 8, 1999.

(51) Int. Cl.[7] .................................................. B60P 7/08
(52) U.S. Cl. ................................ 296/24.43; 296/37.16; 410/118; 410/100
(58) Field of Search .......................... 296/24.43, 24.1, 296/37.1, 37.16, 37.15; 410/117, 118, 97, 100; 160/327, 351; 280/749

(56) References Cited

U.S. PATENT DOCUMENTS

| | | |
|---|---|---|
| 2,669,402 A | 2/1954 | Del Mar |
| 2,705,461 A | 4/1955 | Campbell |
| 2,854,931 A | 10/1958 | Campbell |
| 2,997,331 A | 8/1961 | Kudner |
| 3,049,373 A | 8/1962 | Biggers |
| 3,098,562 A | 7/1963 | Simmons |
| 3,099,313 A | 7/1963 | Peck et al. |
| 3,169,781 A | 2/1965 | Abruzzino |
| 3,190,686 A | 6/1965 | Smiler |
| 3,256,837 A | 6/1966 | Blatt |
| 3,314,379 A | 4/1967 | Krokos |
| 3,336,069 A | 8/1967 | Bayer et al. |
| 3,367,707 A | 2/1968 | Merriweather |
| 3,486,723 A | 12/1969 | Harrison |
| 3,527,984 A | 9/1970 | Flanagan et al. |
| 3,534,998 A | 10/1970 | Johnson et al. |
| 3,612,301 A | 10/1971 | Peacock |
| 3,633,936 A | 1/1972 | Huber |
| 3,662,229 A | 5/1972 | Graff et al. |
| 3,695,698 A | 10/1972 | Trump |
| 3,762,495 A | 10/1973 | Usui et al. |
| 3,762,760 A | 10/1973 | Tomson et al. |
| 3,767,066 A | 10/1973 | Martin et al. |
| 3,767,253 A | 10/1973 | Kluetsch |
| 3,782,758 A | 1/1974 | Williamson, III |
| 3,837,422 A | 9/1974 | Schlanger |
| 3,891,263 A | 6/1975 | Orsulak |
| 3,910,625 A | 10/1975 | Menard |
| RE28,788 E | 4/1976 | Williamson, III |
| 4,096,807 A | 6/1978 | Woodward |

(List continued on next page.)

FOREIGN PATENT DOCUMENTS

| | | |
|---|---|---|
| DE | 3419758 | 11/1985 |
| DE | 2759777 | 6/1986 |
| DE | 3738931 | 6/1989 |

(List continued on next page.)

Primary Examiner—Stephen Gordon
(74) Attorney, Agent, or Firm—Young & Basile, P.C.

(57) ABSTRACT

A barrier net for motor vehicles of the type having a forward passenger compartment and cargo area behind the passenger compartment. The barrier net comprises a netting member adapted to restrain stowage within the cargo area from entering the passenger compartment. A mechanism is provided for removably attaching both the netting member top to the cargo area and the netting member bottom to the cargo area. The barrier net further comprises a mechanism for rendering the netting member taut.

39 Claims, 11 Drawing Sheets

U.S. PATENT DOCUMENTS

| | | |
|---|---|---|
| 4,121,356 A | 10/1978 | Gambon |
| 4,139,231 A | 2/1979 | Lang |
| 4,168,667 A | 9/1979 | Loomis |
| 4,213,636 A | 7/1980 | King |
| 4,215,895 A | 8/1980 | Phillips |
| 4,222,601 A | 9/1980 | White et al. |
| 4,265,577 A | 5/1981 | Loomis |
| 4,368,902 A | 1/1983 | McDowell |
| 4,396,325 A | 8/1983 | Joice-Cavanagh |
| 4,436,466 A | 3/1984 | Marino |
| 4,671,557 A | 6/1987 | Lemp |
| 4,728,141 A | 3/1988 | Motozawa et al. |
| 4,763,944 A | 8/1988 | Fry et al. |
| 4,781,498 A | 11/1988 | Cox |
| 4,852,194 A | 8/1989 | Langan |
| 4,900,204 A | 2/1990 | Summers |
| 4,915,437 A | 4/1990 | Cherry |
| 4,919,467 A | 4/1990 | Guimelli |
| 4,932,704 A | 6/1990 | Ament |
| 4,957,250 A | 9/1990 | Hararat-Tehrani |
| 4,964,771 A | 10/1990 | Callihan |
| 4,981,225 A | 1/1991 | Cole |
| 5,011,208 A | 4/1991 | Lewallen |
| 5,026,231 A | 6/1991 | Moore |
| 5,035,471 A | 7/1991 | Ackerman |
| 5,040,934 A | 8/1991 | Ross |
| 5,090,856 A | 2/1992 | Moore |
| D325,016 S | 3/1992 | Moore |
| 5,102,103 A | 4/1992 | Putnam |
| 5,114,288 A | 5/1992 | Langendorf et al. |
| 5,121,958 A | 6/1992 | Goaden et al. |
| 5,139,375 A | 8/1992 | Franchuk |
| 5,170,829 A | 12/1992 | Duncan et al. |
| 5,186,587 A | 2/1993 | Moore |
| 5,207,260 A | 5/1993 | Commesso |
| 5,288,122 A | 2/1994 | Pilhall |
| 5,316,358 A | 5/1994 | Payne et al. |
| 5,328,310 A | 7/1994 | Lockney |
| 5,348,433 A | 9/1994 | Watson |
| 5,353,891 A | 10/1994 | Griek et al. |
| 5,427,486 A | 6/1995 | Green |
| 5,437,474 A | 8/1995 | Ament |
| 5,444,836 A | 8/1995 | Hollingsworth et al. |
| 5,452,973 A | 9/1995 | Arvin .................. 410/118 |
| 5,458,447 A | 10/1995 | Clason .................. 410/100 |
| 5,538,306 A | 7/1996 | Ament |
| 5,551,726 A | 9/1996 | Ament |
| 5,618,077 A | 4/1997 | Ament et al. |
| 5,676,415 A | 10/1997 | Ament et al. |
| 5,695,217 A | 12/1997 | Ament et al. |
| 5,772,370 A | 6/1998 | Moore .................. 410/100 |
| 5,820,187 A | 10/1998 | Ament et al. |
| 5,876,064 A | 3/1999 | Ament et al. |
| 5,954,380 A | 9/1999 | Ament et al. |
| 5,961,172 A | 10/1999 | Ament et al. |
| 5,971,433 A | 10/1999 | Ament et al. |
| 6,099,222 A | 8/2000 | Moore .................. 410/100 |
| 6,125,908 A | 10/2000 | Ament et al. |
| 6,183,028 B1 | 2/2001 | Ament et al. |
| 6,554,339 B1 * | 4/2003 | Moore .................. 296/24.1 |

FOREIGN PATENT DOCUMENTS

| | | |
|---|---|---|
| DE | 4300904 | 7/1993 |
| DE | 44 10 681 A1 | 3/1994 |
| DE | 196 41 794 A1 | 10/1996 |
| DE | 19520584 | 12/1996 |
| DE | 197 11 868 C1 | 3/1997 |
| DE | 197 35 463 C1 | 3/1997 |
| DE | 297 04 724 U1 | 3/1997 |
| EP | 203824 | 12/1986 |
| EP | 0 642 955 A1 | 8/1994 |
| EP | 0659611 | 6/1995 |
| EP | 0 995 641 A1 | 4/2000 |
| FR | 2470033 | 6/1981 |
| FR | 2714342 | 6/1995 |
| FR | 27 68102 | 3/1999 |
| GB | 2273481 | 6/1974 |
| JP | 61193949 | 8/1986 |
| JP | 4002534 | 1/1992 |

* cited by examiner

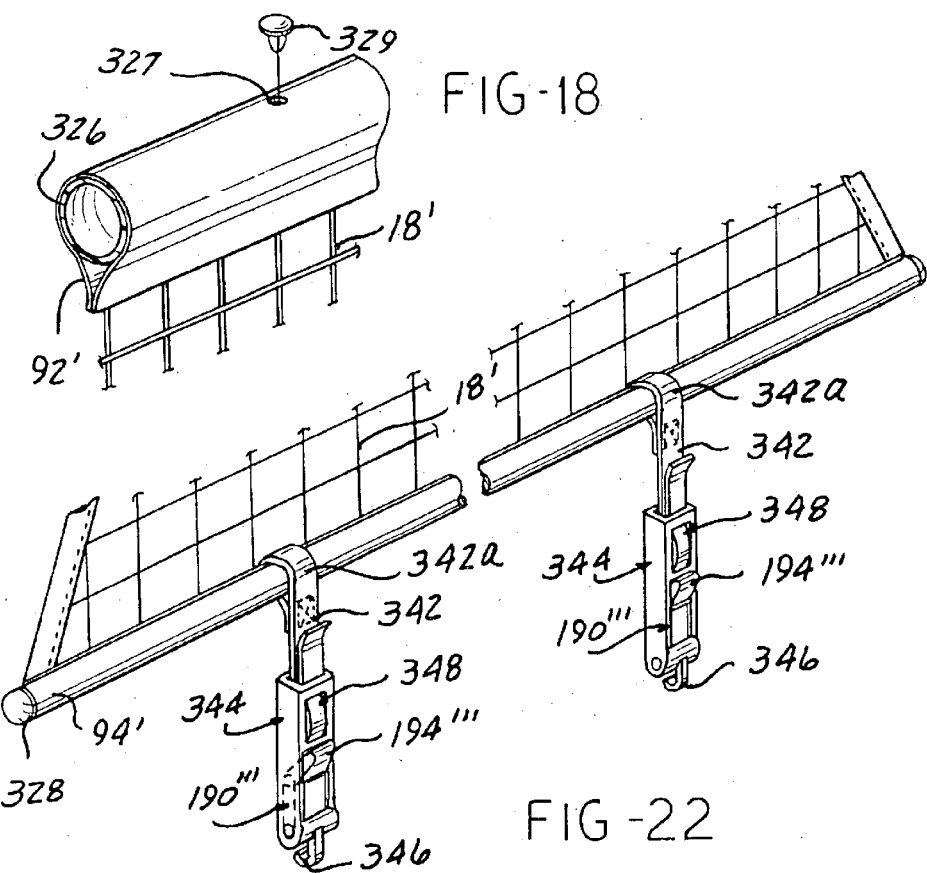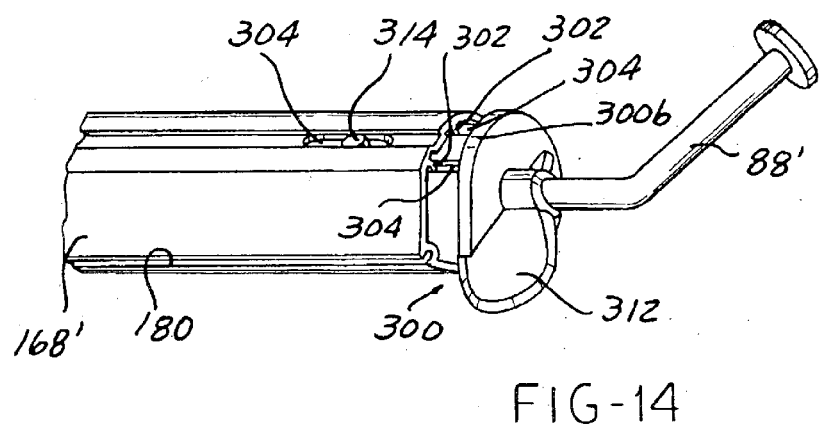

ized bar net (US 6,817,644 B2)

LOAD RETAINING BARRIER NET FOR MOTOR VEHICLE

CROSS-REFERENCE TO RELATED APPLICATIONS

This application is a divisional of U.S. patent application Ser. No. 09/612,062 for a LOAD RETAINING BARRIER NET FOR MOTOR VEHICLE, filed on Jul. 7, 2000 now U.S. Pat. No. 6,554,339, which claimed the benefit of Provisional Application Ser. No. 60/142,782, filed on Jul. 8, 1999, and also was a divisional and continuation-in-part of U.S. application Ser. No. 08/979,603 for a RETRACTABLE AND/OR REMOVABLE NET TYPE CARGO RESTRAINING SYSTEM, filed on Nov. 26, 1997, now U.S. Pat. No. 6,099,222, issued on Aug. 8, 2000; which was a continuation-in-part of U.S. patent application Ser. No. 08/561,926 for a RETRACTABLE AND/OR REMOVABLE LOAD RETENTION NET, filed on Nov. 22, 1995, now U.S. Pat. No. 5,772,370, issued on Jun. 30, 1998.

BACKGROUND OF THE INVENTION

The present invention relates generally to load retention nets for use in automotive vehicles, and more particularly to a removable barrier net which extends between the top of a passenger seat and the interior of the vehicle roof.

Governments around the world are beginning to recognize the need for automotive safety standards for passengers above and beyond such items as passive passenger restraint systems. For example, recently the United Nations and European communities began imposing laws in which automobile manufacturers must attempt to provide a safe environment for passengers while traveling with minimum loads of 10 Kg to 100 Kg. This weight should be restrained by a restraint mechanism during frontal impacts at 50 km/h, with approximate maximum deflection of the restraint mechanism being about 300 mm or less. The minimum force this would generate during such an impact is quite high. As such, the above-mentioned lawmakers are hoping to see means by which high G-force loads are restrained from entering the passenger compartments of motor vehicles such as station wagons, sport utilities, mini vans and other motor vehicles, including passenger vehicles having fold-down rear seats.

In addition, consumers continually seek more efficient, convenient and versatile ways to transport or store contents stowed in such a motor vehicle. One disadvantage of the traditional storage space in the above-mentioned motor vehicles is that stowage is freely movable within the storage compartment, and can be damaged during transport and/or in the event of a sudden stop or impact.

Attempts have been made to answer the above-mentioned needs. One such attempt is found in U.S. Pat. No. 4,919,467 issued to Guimelli. This patent discloses a vehicle safety screen having a tubular metal peripheral frame traversed by a heavy wire mesh. The frame is mounted to four vehicle anchorage points via rearwardly projecting upper metal securing straps. The ends of the straps adjacent the anchorage points are attached thereto by a securing bolt extending transversely through the strap end, a cover plate, the vehicle body panel and a mounting plate, and is engaged within a captive nut.

The Guimelli patent answers the safety need relatively satisfactorily; however, the heavy wire mesh and tubular metal frame are aesthetically displeasing. Further, specific tools must be used to attach and/or detach the device, and such attachment/detachment can be time consuming and difficult. Still further, if the securing bolt is not properly engaged (which could be difficult to determine), the device could detach in the event of a crash; and, due to the heaviness of the device, the device itself could cause injury. Further, in the event of a sudden stop, the sound of items striking the heavy wire mesh would be quite loud, and the items could be damaged after impacting the wire mesh. Yet still further, if the device were not needed, due to the difficulty in removing it, the consumer may leave it installed although undesired. Even if it were removed, due to its bulkiness, storage of it within the motor vehicle would be limited to laying it flat on the floor, thereby taking up valuable storage space and being subject to noisy movement during transport.

U.S. Pat. No. 3,891,263 issued to Orsulak discloses a safety shield and compartmentalizer wherein the vehicle rear seat is modified to hold a cylindrical container having a flexible, opaque panel adapted to be pulled out of the container through a longitudinal slot in the container and outward from a transverse slot defined in the upper rear portion of the rear seat back rest. The panel is pulled from a retracted position and fastened to the rear wall or roof of the vehicle. The panel is retracted by an electric motor or a conventional window shade apparatus.

The Orsulak patent answers the safety need somewhat; however, it appears that the attachment means would not be load restraining in the event of a frontal impact as described above—a simple "window shade apparatus" or electric motor may not prevent further opaque panel from paying out, thereby allowing cargo to travel farther than desired, which may result in injury to passengers. Further, although the Orsulak device may be considered more aesthetically pleasing than the Guimelli device, it is not practical for installation in a motor vehicle. Even if feasible (given the strict weight limits, design specifications, passenger compartment space constraints, etc. for motor vehicles), it would be very expensive and difficult to develop and/or modify tooling to include such a cylindrical container, panel retracting motor and/or window shade apparatus defined within the rear seat. Still further, if the device were not included as an OEM option it would be very difficult, if not impossible, to include it as an after market option.

Thus, it is an object of the present invention to provide a barrier net which will satisfactorily restrain loads from entering the passenger compartment of a motor vehicle during frontal impacts, thereby advantageously providing safety to passengers. It is a further object of the present invention to provide such a net which is aesthetically pleasing. It is another object of the present invention to provide such a net which is quickly attachable/detachable from its respective vehicle attachment areas, without the need for tools. It is a further object of the present invention to provide an attachment means for such a net, which attachment means is advantageously simple to discern if secure. It is a further object of the present invention to provide such a net which is easy to handle and compactable for storage. Further, it is an object of the present invention to provide such a net which is relatively inexpensive and simple to manufacture and install within the motor vehicle, and may be done either as an OEM option or as an after market option. Still further, it is an object of the present invention to provide such a net which is strong and resilient, yet lightweight. Further, it is an object of the present invention to provide a barrier net which may be easily removed from the vehicle, if desired. Yet further, it is an object of the present invention to provide such a barrier net which may be attached to the vehicle behind an operator's or passenger's seat to prevent cargo from moving forwardly into the occupied portion of the passenger compartment.

SUMMARY OF THE INVENTION

The present invention addresses and solves the above-mentioned problems and meets the enumerated objects and advantages, as well as others not enumerated, by providing a barrier net for use within a motor vehicle having a rear cargo area and a forward passenger compartment. The barrier net comprises a netting member having a top, a bottom and two opposed sides, the netting member adapted to restrain stowage within the cargo area from entering the passenger compartment. Means are provided for attaching the netting member to the cargo area, wherein the attaching means comprises first means for attaching the netting member top to the cargo area, and second means for attaching the netting member bottom to the cargo area, wherein both the first and second attaching means are removable. The barrier net further comprises means for rendering the netting member taut.

BRIEF DESCRIPTION OF THE DRAWINGS

Other objects, features and advantages of the present invention will become apparent by reference to the following detailed description and to the drawings, in which:

FIG. 14 is a partial perspective view of an alternative means for attaching and tautening the upper end of the net;

FIG. 18 is a detail of the upper support tube of FIG. 17;

FIG. 22 is a perspective view of an alternative tautening means for the lower portion of the netting member.

DETAILED DESCRIPTION OF THE PREFERRED EMBODIMENTS

Figure 1:
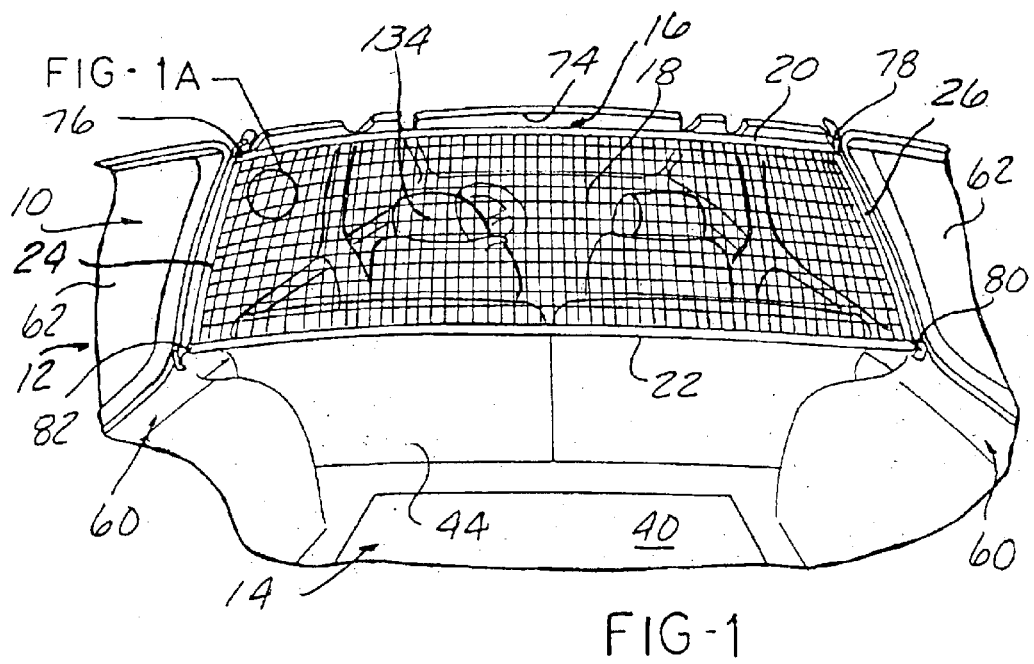
FIG. 1 is a partially cutaway perspective view, looking forwardly in a vehicle, of a first embodiment of the present invention and showing the net extending across an open area between a forward passenger area and a rear cargo area.

Referring to FIG. 1, the barrier net of the present invention is designated generally as 10. Barrier net 10 is for use within a motor vehicle 12, for example a station wagon or a sport utility vehicle, having a cargo area 14 located behind a seat back 44 and a passenger compartment 16 located forwardly of the seat back. An open space 74 extends transversely between the cargo area 14 and the passenger compartment 16 above the seat back 44, and the invention barrier net extends across the open space 74 to restrain stowage or cargo (not shown) within the cargo area 14 from entering the passenger compartment 16.

Barrier net 10 comprises a netting member 18 which is generally rectangular, trapezoidal or any shape suitable for substantially covering the open space 74 above the seat back 44, and has a top 20, a bottom 22 and two opposed sides 24,26. The netting member 18 is removably secured to the interior of the vehicle 12 such that two upper corners 76,78 of the netting member are adjacent the interior roof 70 of the vehicle and the upper edge of the window 62, and two lower corners 80,82 are slightly behind the top edge of the seat back 44 and approximately even with the lower edge of the window 62 and adjacent a beam 72 of the vehicle. The horizontal lines extending along either side of the interior of the vehicle 12 at a height approximately even with the lower edge of the window 62 are hereinafter referred to as the belt line 60.

Figure 1A:
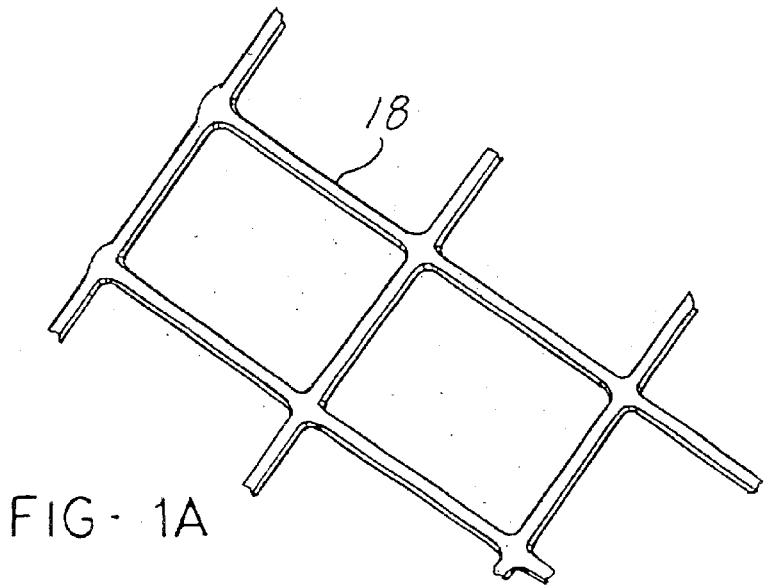
FIG. 1A is an enlarged view of an alternate embodiment of netting material for the net of FIG. 1.

It is to be understood that the netting member 18 may be formed from any suitable natural or synthetic material and by any suitable process. However, in the preferred embodiment, the netting member 18 comprises a lightweight, resilient and strong synthetic material selected from the group consisting of coated polyesters, multifilament polypropylenes, nylons, and mixtures thereof. Further, in the preferred embodiment, the netting member 18 is formed by at least one of woven, knitted, rochelle, and weft insertion processes. Netting member 18 may alternately comprise a flexibly rigid, extruded polymeric material such as engineered plastics, as shown in FIG. 1A. In either the preferred or alternate embodiment, it may be preferable for the netting member 18 to be of a very small mesh size, eg. from about a 1 mm mesh to about a 2 mm mesh. This small mesh size is easily seen through and may cause less eye fatigue than a mesh of a larger size may cause. Further, the small mesh may add strength to the netting member 18 in that there is more material per square centimeter than with a larger mesh.

Figure 2A:
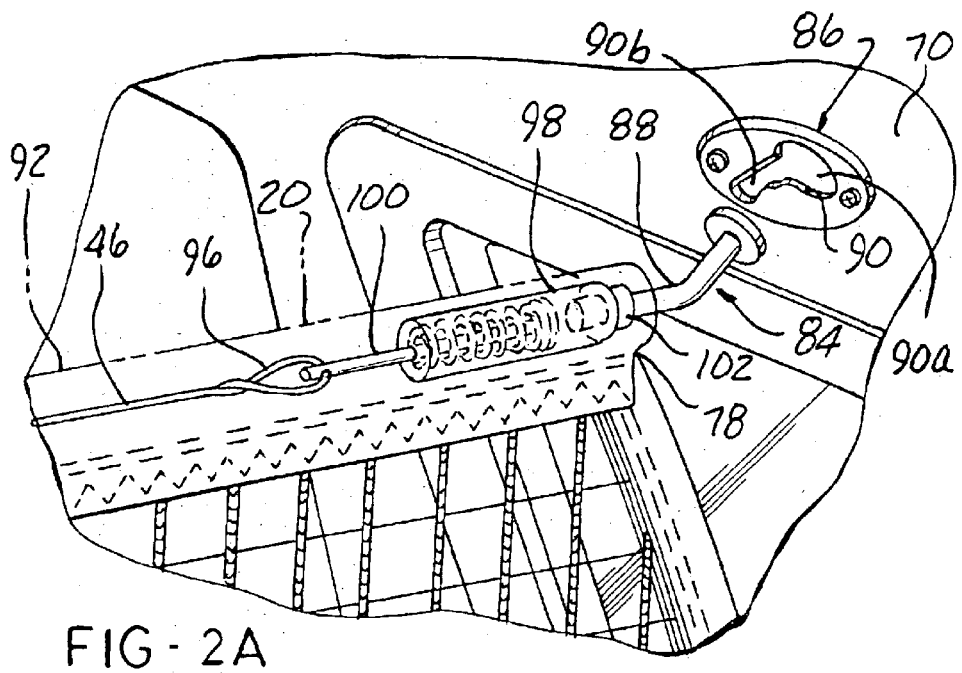
FIG. 2A is a detail view showing an upper attachment means of the net of FIG. 1.
Figure 2B:
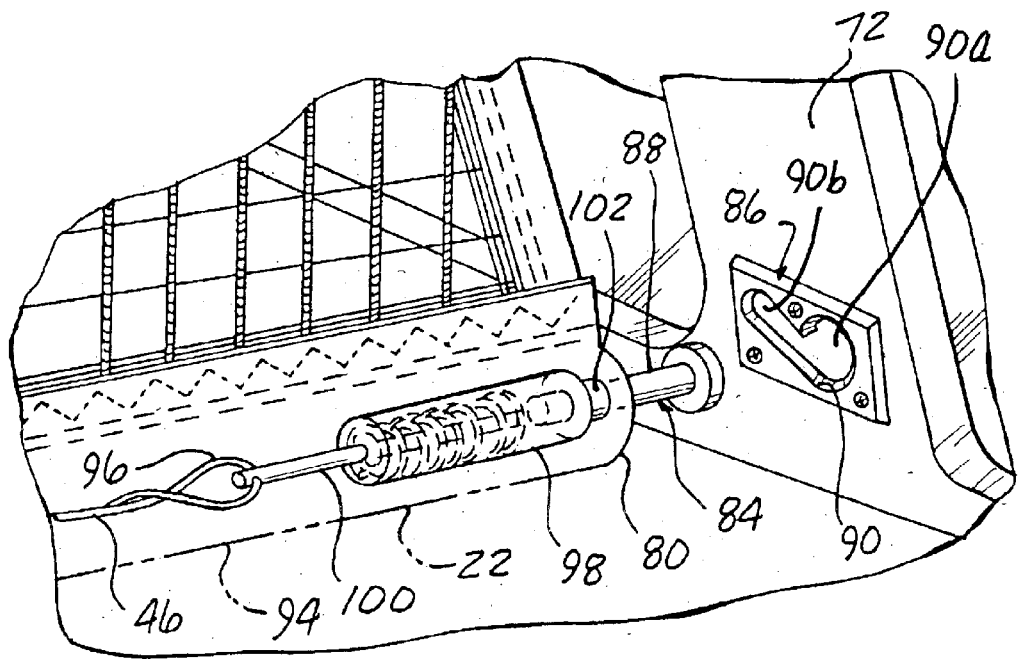
FIG. 2B is a detail view showing a lower attachment means of the net of FIG. 1.
Figure 5:
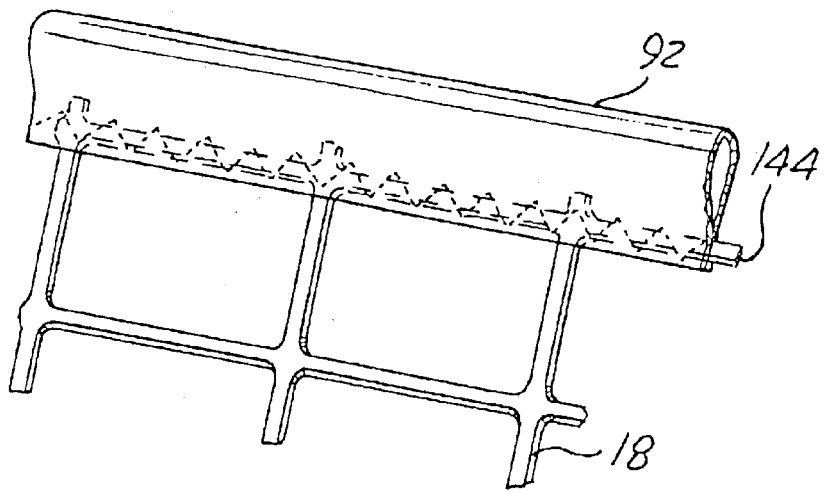
FIG. 5 is an enlarged view of an alternate embodiment of netting material for the net of FIG. 4.

In the first embodiment of the invention, as best seen in FIGS. 2A and 2B, a first sleeve 92 is attached to the netting member top 20 along substantially the entire length thereof, and a second sleeve 94 is attached to the netting member bottom 22. The sleeves 92,94 may be formed of any suitable material, but in the preferred embodiment are formed from polyester or nylon web strap, or a woven vinyl material. The upper and lower sleeves 92,94 may be formed from a web strap material having heavy denier threads which may act as a rip stop (lock stitch) so as to prevent the sleeves 92, 94 ripping open at the sewn seams. The sleeves 92,94 must be securely attached to the netting member. This may be accomplished in any number of ways including, as shown in FIG. 5, by sewing the weft 144 of the netting member 18 into the lower edge of the sleeve 92.

A load-rated cord 46 extends longitudinally within each of the sleeves 92,94. The cords 46 may be formed of any suitable material which exhibits high tensile strength and low stretch, and by any suitable process. In the preferred embodiment, cords 46 comprise any one of the following: web strap formed from at least one of nylon, polyester, polypropylene and the like; and/or braid on braid cord formed from at least one of nylon, polyester, polypropylene and the like; and/or twisted cable formed from at least one of galvanized or stainless steel and the like. Of these, most preferred are web strap and/or braid on braid cord.

Four spring-loaded tension apparatuses 98 are provided, one disposed within each end of the sleeves 92,94. Each tension apparatus 98 has a first end 100 operatively attached to an end 96 of one of the cords 46, and a second end 102 attached to a male projection 88 which extends longitudinally out the end of the sleeve. The tension apparatuses 98 function to urge the male projections 88 inwardly relative to the cords 46.

Female coupling members 86 are secured to the interior of the vehicle 12 adjacent the positions where the corners 76,78,80,82 of the netting member are to be retained. Each female coupling member 86 defines a key slot 90 having a circular portion 90a and an elongated portion 90b extending therefrom toward the front of the vehicle 12. The male projections 88 have enlarged, flange-like ends 84 matingly engageable with the female coupling members 86. As shown in FIG. 2A, the male projections 88 at the upper corners of the barrier net 10 may be crooked or curved somewhat in order to properly engage a female coupling member 86 which is located on the roof interior above the end of the net.

The male projections 88 and female coupling members 86 combine to provide an attachment means which is sturdy, yet is quick and easy for one person to attach to and detach from the vehicle 12 without need for special tools. Once removed from attachment to the vehicle 12, the netting member 18 may be easily rolled, folded or the like for easy and compact storage.

In addition to tautening the netting member 18, the spring loaded tension apparatus 98 may further function to absorb some of the shock experienced during a sudden stop or impact. Still further, apparatus 98 aids the consumer in attaching/detaching barrier net 10 quickly and easily. The taut rendering means also may enhance the aesthetics of net 10 by keeping the netting member 18 from sagging.

Figure 3A:
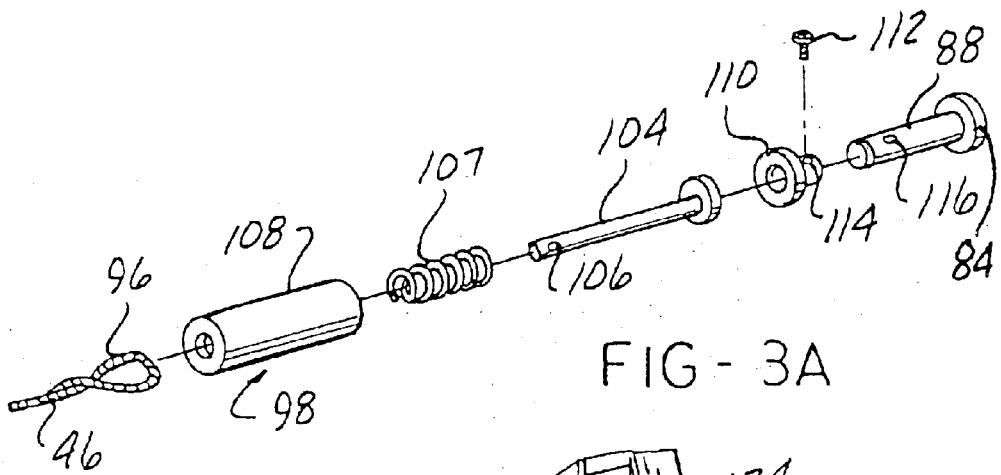
FIG. 3A is an exploded perspective view of the attachment means and net tautening means shown in FIG. 2B.
Figure 3B:
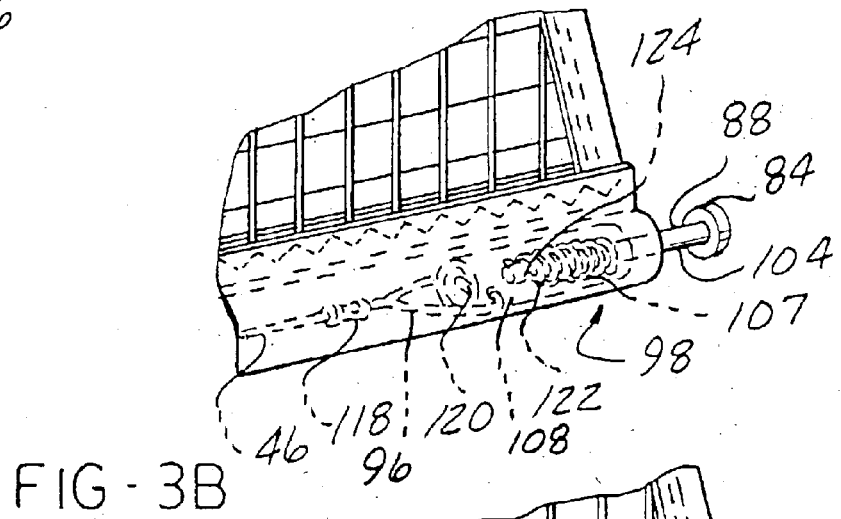
FIG. 3B is a detail view of an alternate attachment means and net tautening means.
Figure 3C:
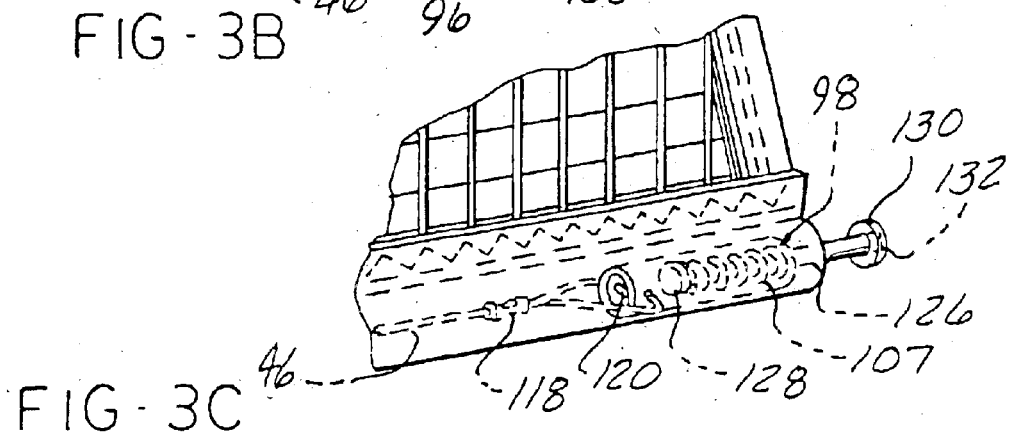
FIG. 3C is a detail view showing a further alternate attachment means and net tautening means.

Alternate embodiments of the taut rendering means are shown in FIGS. 3A–3C. FIG. 3A is an exploded view of the mechanism shown in FIG. 2B. Cord end 96 is attached to spring retainer rod 104 via throughbore 106. Spring 107 is retained by rod 104 within cylinder 108. Cylinder cap 10 is bonded to cylinder 108, and attachment rod/male projection 88 is attached to cap 110 via screw 112 and threaded bores 114, 116. In FIG. 3B, cord 46 has a crimped-on cable clip 118 to form a loop, and end 96 is attached to cylinder 108 via cable sleeve 120. In lieu of clip 118, cord 46 could terminate in a sewn loop. Spring 107 is retained by retainer pin 122 via throughbore 124 located in male projection 88. In FIG. 3C, a retainer rod 126 retains spring 107 within cylinder 108 via annular flange 128. Retainer rod 126 has a smooth shaft with a threaded end 132 located distally from the annular flange 128. The threaded end 132 is threadingly engaged within end cap 130. Any of the above taut rendering means components may be formed of any suitable materials and by any suitable process. Components such as cylinder 108, cap 110, rods 104, 126, etc. may be formed of engineered plastic and/or metal; however, in the preferred embodiment, these components are formed from engineered plastic.

Figure 6A:
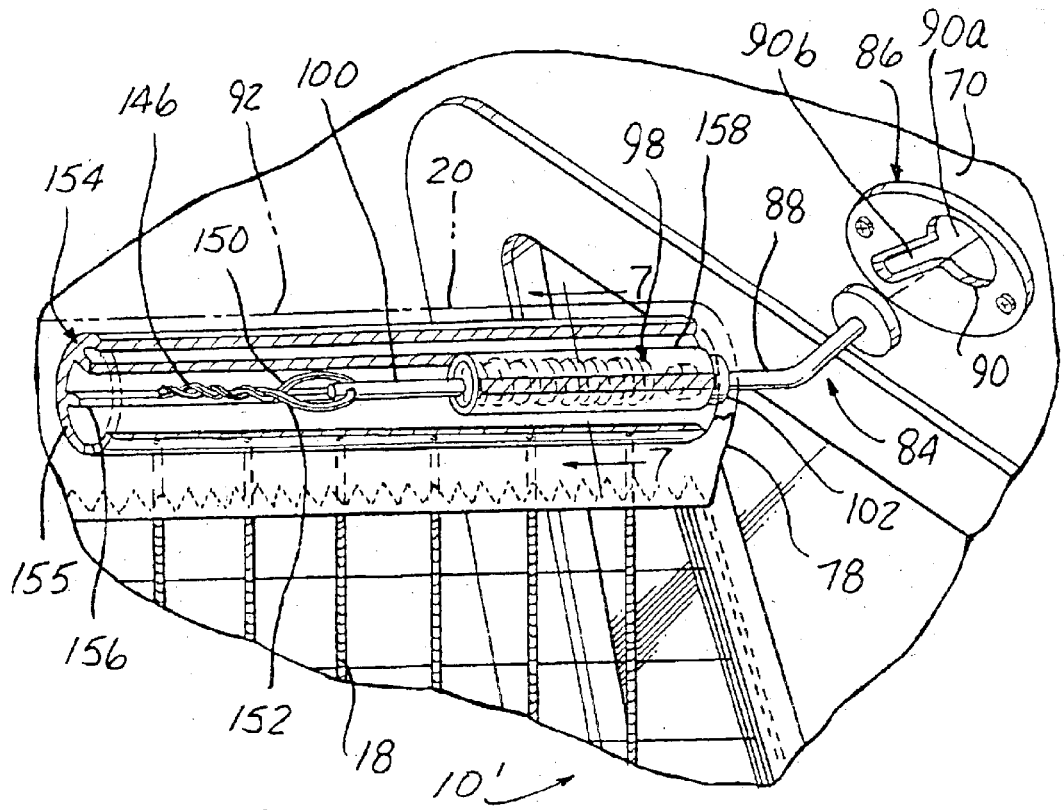
FIG. 6A is a partially cutaway, partially cross sectional, enlarged perspective view, showing an alternate embodiment of the net of FIG. 1.
Figure 6B:
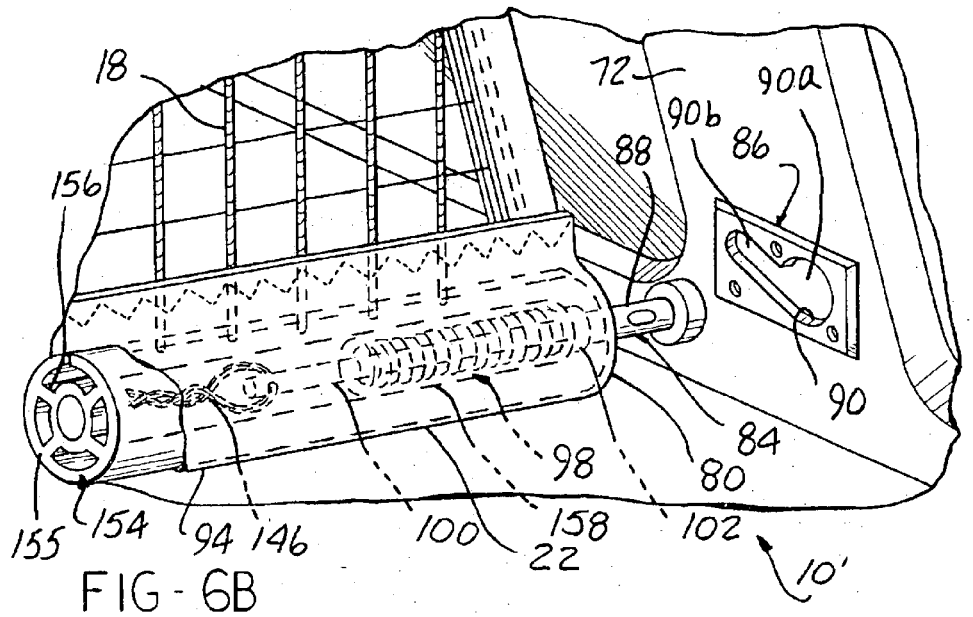
FIG. 6B is a partially cutaway, partially cross sectional, enlarged perspective view, showing a bottom portion of the alternate embodiment of the net of FIG. 1.

An alternate embodiment of the taut rendering means for a barrier net 10' is shown in FIGS. 6A and 6B. This embodiment includes upper and lower sleeves 92,94 as described hereinabove, and four spring loaded tension apparatuses 98 which, with the exception of the following, are substantially as described hereinabove. In the barrier net 10' of this embodiment, cylinder 108 of the previously described embodiment is replaced by a hollow guide member 154 extending longitudinally through each of the sleeves 92,94. Guide member 154 has a generally tubular outer wall 155 and has at least one positioning web 156 formed integrally therewith and projecting radially inward. A hollow inner housing 158 is integrally formed with the positioning web(s) 156, the inner housing being adapted to contain and position the spring loaded tension apparatuses 98. It is to be understood that the guide members 154 may be formed from any suitable material and by any suitable method, such as a polymeric material, metal or any other suitably rigid material. However, in the preferred embodiment, these components are formed from engineered plastic. The guide member 154 itself need not be designed to withstand the large loads caused by a vehicle impact, since the cord 46 is engineered to bear the loads applied to the netting member.

The taut rendering means further comprises an energy absorbing cord 146 extending longitudinally within each guide member 154. By "energy absorbing cord," it is meant that cord 146 has a controlled amount of strength and a known amount of shock/impact/energy absorption. It is to be understood that any suitable energy absorbing cord 146 may be used. However, in the preferred embodiment, the energy absorbing cord 146 is formed from tightly wound metal wire. This wire may be formed from any suitable metal, including but not limited to galvanized steel, stainless steel or the like. Still more preferred is that cord 146 be formed from at least two or more strands 150, 152, as best seen in FIG. 6A, and is preferably wound at least four turns/inch.

Energy absorbing cord 146 is adapted to absorb energy during an impact, thereby helping to maintain the integrity of barrier net 10' and aiding in prevention of stowage entering the passenger compartment. During an impact, the wound cord 146 will unravel as it absorbs energy and, once deflected in this manner, the cord 146 and/or net 10' would have to be replaced.

Figure 7:
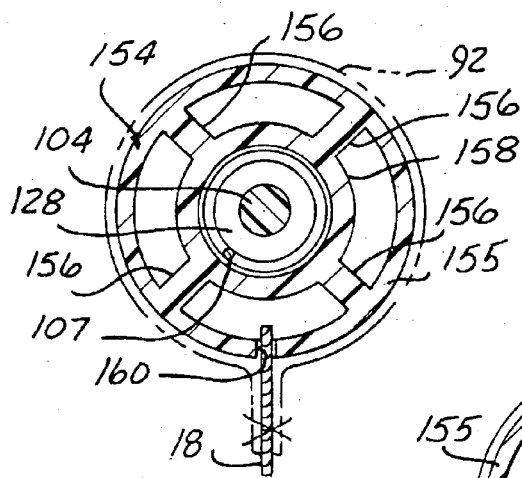
FIG. 7 is a cross sectional view taken on line 7—7 in FIG. 6A.
Figure 8:
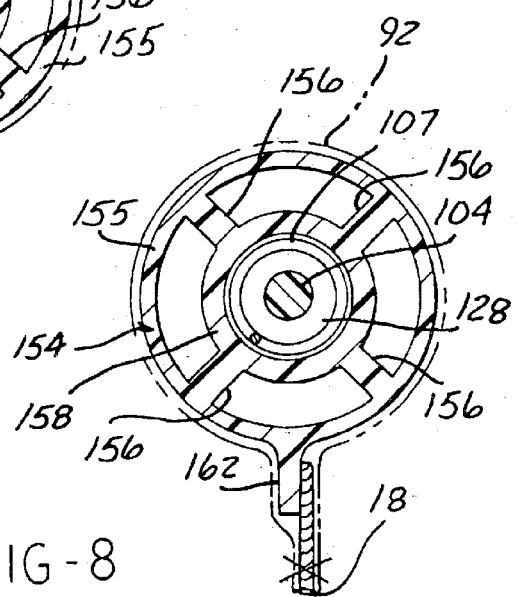
FIG. 8 is a view similar to FIG. 7 of an alternate embodiment of the guide member.

FIGS. 7 and 8 depict two alternate embodiments for attaching netting member 18 to the guide member 154. In FIG. 7, netting member 18 is operatively attached to guide member 154 through a groove 160 extending longitudinally along the guide member 154. In FIG. 8, netting member 18 is operatively attached to and positioned along guide member 154 by outwardly extending projection 162 extending longitudinally along the guide member 154.

Figure 4:
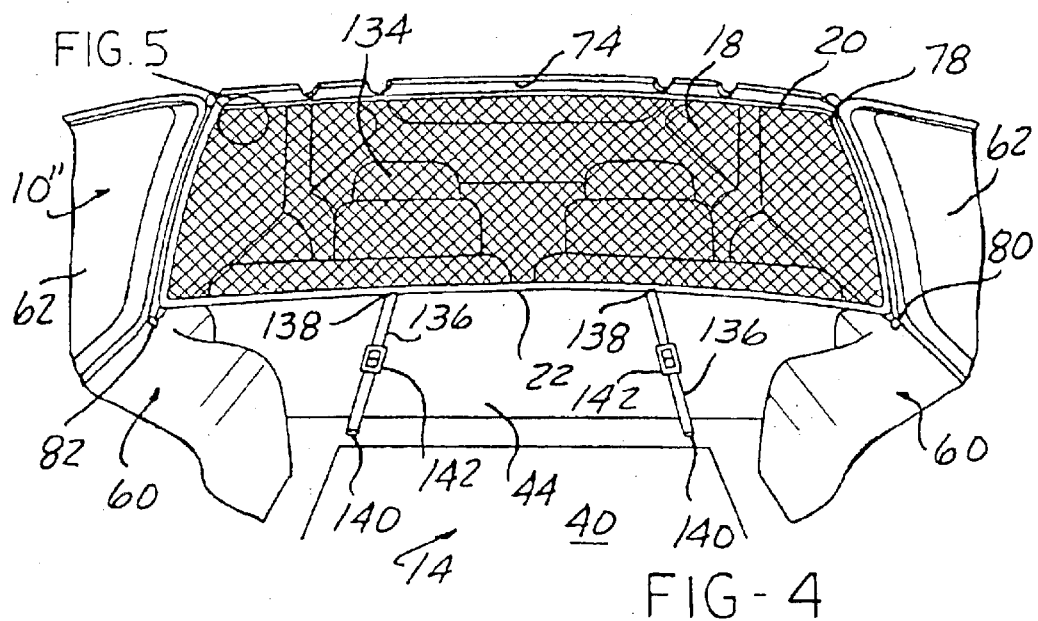
FIG. 4 is a perspective view of an alternate embodiment of a net according to the invention.

An alternate embodiment of the bottom attachment means and taut rendering means for a barrier net 10" is shown in FIG. 4. In this embodiment, the taut rendering means comprises at least one strap 136 having an upper end 138 attached to the bottom 22 of the netting member, and a lower end 140 attached to the cargo floor 40 by any suitable means. It is to be understood that any number of straps 136 may be used as desired and/or necessitated by a particular end use. In the preferred embodiment, two straps 136 are used, as shown. The taut rendering means further comprises means for shortening the straps 136 until the netting member 18 is taut. It is to be understood that this shortening means may comprise any suitable means, however, in the embodiment shown in FIG. 4, this means comprises a belt-loop type tightening ring 142.

Figure 9:
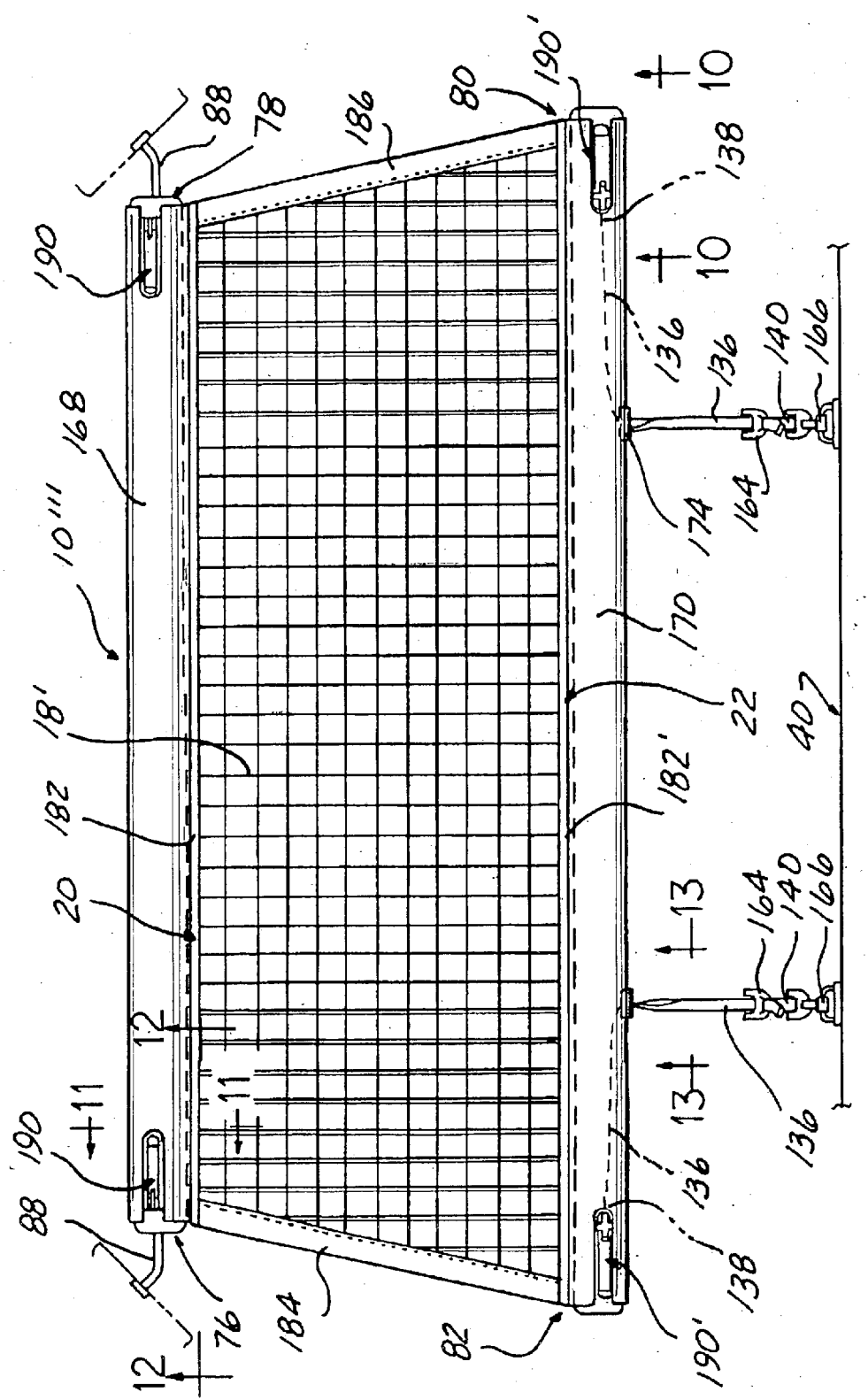
FIG. 9 is a view of yet another alternate embodiment of the net of FIG. 1.

Referring now to FIG. 9, a further alternate embodiment of the barrier net is designated generally as 10'". As in the previously described embodiments of the present invention, a netting member 18' extends across the open space extending transversely between a driver's seat and/or passenger seat and the cargo area of the motor vehicle such as a station wagon, hatch back, or sport utility vehicle. It is to be understood that in any of the embodiments shown in FIGS. 1, 4 and 9, the netting member may also extend across the open space extending transversely between the driver's seat (first row of seats) and a second row of seats.

As in the previously described embodiments of the present invention, the netting member 18' is generally rectangular, trapezoidal, or any suitable shape and may be made of any suitable material. In the preferred embodiment, however, netting member 18' is formed from polyester, polypropylene or nylon. The netting member 18' may be color coded or color keyed to match the motor vehicle interior.

Netting member 18' further comprises web straps 184,186 which are sewn, or attached by any other suitable means, to the lateral edges of netting member 18'. Web straps 184, 186 may be formed from any suitable material, however, in the preferred embodiment, is formed from nylon, polypropylene or a polyester woven material.

As can be seen in FIG. 9, the cords forming the vertical warp of the netting member 18' is relatively thin at the center of the net and becomes progressively thicker toward each of the web strap edges 184, 186. This difference in warp cord thickness directs energy due to an impact toward the center of the assembly, which is generally the strongest area Having the netting cord the thinnest at the center of netting member 18' also allows for greater visibility behind the driver while utilizing the rear view mirror.

Figure 11:
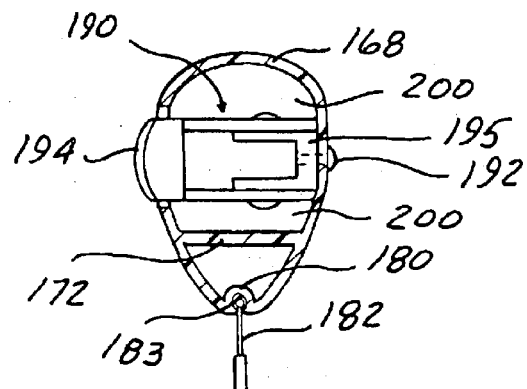
FIG. 11 is a cross sectional view taken on line 11—11 of FIG. 9.

Barrier net 10'" comprises an upper support beam 168 and a lower support beam 170 made of any suitable material, including a polymeric material such as polyvinyl chloride (PVC), aluminum, or steel. In the preferred embodiment, beams 168,170 are extruded from a suitable aluminum or aluminum alloy material. The beams 168,170 have a teardrop cross sectional configuration, as best seen in FIG. 11. This teardrop shape provides high structural strength under crash conditions. Further, the beams comprise an internal reinforcement web 172 to strengthen the beams and prevent bending about the X or Y axes of the beam. The outer surfaces of beams 168, 170 may be textured and/or colored to match the interior decor of the vehicle 12.

As best seen in FIG. 11, the upper support beam 168 has a channel-like track 180 extending longitudinally along the downwardly oriented surface thereof. The track 180 is preferably formed integrally with the support beam 168 during the extrusion process. The lower support beam 170 is substantially the mirror image of beam 168, and has a channel-like track identical to that of the upper support beam extending along its upwardly oriented surface.

Netting member 18' has first and second net cords 182, 182' extending along the upper and lower edges 20,22 respectively. Each net cord 182,182' has an enlarged bead such as bead 183 (see FIG. 11) of the correct diameter to slide into tracks 180 on beams 168,170 respectively, thereby securely retaining the netting member 18' in connection with the upper and lower support beams along the entire length of the upper and lower net edges. Net cords 182,182' are formed from a suitable material so as to absorb a predetermined amount of energy during a collision of the motor vehicle. In the preferred embodiment, the bead 183 is mono-filament cord approximately two to five millimeters in diameter.

Figure 12:
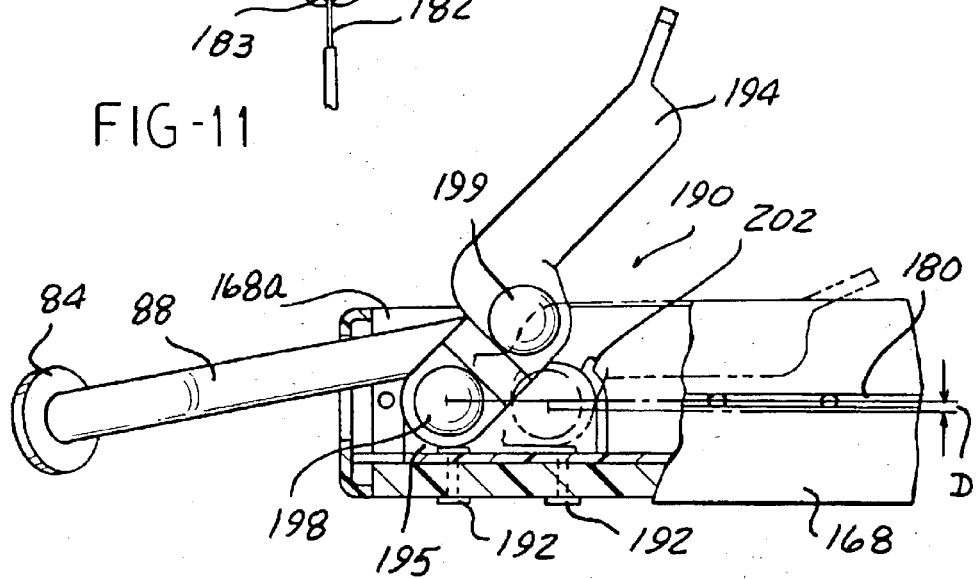
FIG. 12 is a, partially cutaway cross sectional view taken on line 12—12 of FIG. 9.

A netting member-to-cargo area attaching means is disposed at either end of upper support beam 168 to hold the upper corners 76,78 of the barrier net adjacent the interior roof 70 and above the window 62. As best seen in FIG. 12, the attaching means for the upper corners comprise male projections 88 extending from the ends of the support beam 168 and matingly engageable with female coupling members (not shown) secured to the vehicle interior at respective locations. The female coupling members are preferably generally similar to those depicted in FIGS. 2A and 6A, having key slots for receiving flange-like ends 84 of the male projections 88.

The male projection 88 at either end of the beam 168 is attached to an over-center lever mechanism 190, one of which is contained within each opposite end of upper support beam 168. Lever mechanism 190 comprises a base 195, and a locking arm 194 pivotally mounted to the base by a first clevis pin 198. The base 195 is fastened within the upper support beam 168 by, for example, rivets 192. This fastening means may also be screws, nuts and bolts, or any other suitable and desired fastening means. The end of the male projection 88 is pivotally connected with the locking arm by a second clevis pin 199. The locking arm 194 projects through a rectangular window 168a in the wall of the support beam 168, and movement of the locking arm from the raised and open position to the down and closed position (shown in phantom lines in FIG. 12) draws the male projection inwardly along the longitudinal axis of the support beam 168, effectively shortening the overall length of the beam/male member assembly. When the male projections 88 are inserted into their respective female coupling members and lever mechanisms 190 at both upper corners 76,78 are then moved to the closed positions, tension is applied to male projections 88, thereby securely locking upper beam 168 into place.

When the locking arm 194 is in the closed position the centers of clevis pins 198,199 are offset by a predetermined distance D (see FIG. 12) to promote a positive lock under high stress. This predetermined offset may be any distance as necessary or desired, however, in the preferred embodiment, the distance D is about 4 mm. Locking arm 194 may be made of any suitable material, including metal, a polymeric material or a centipreme material.

As best seen in FIG. 11, an energy absorbing crush zone 200 comprising a void space of a predetermined amount (in the preferred embodiment, about 1 mm) extends on either side of lever mechanism 190. This crush zone allows the support beam 168 to deform somewhat during an impact without damaging the lever mechanism. The support beam 168 also provides structural support to lever 190 when high outward pressure is exerted. Lever mechanism 190 further comprises a snap fit positive lock member 202 which aids in keeping locking arm 194 from inadvertently leaving the closed position, and also aids in preventing undesirable rattling of lever 190 during vehicle travel. It is also possible for the male projection at one or both ends of the upper support beam to be directly and immovably fastened to support beam 168, with no lever mechanism. This may be achieved by any conventional means, such as a suitable fastener (a screw, bolt, pin, or the like) through the male member and the support beam.

Figure 15:
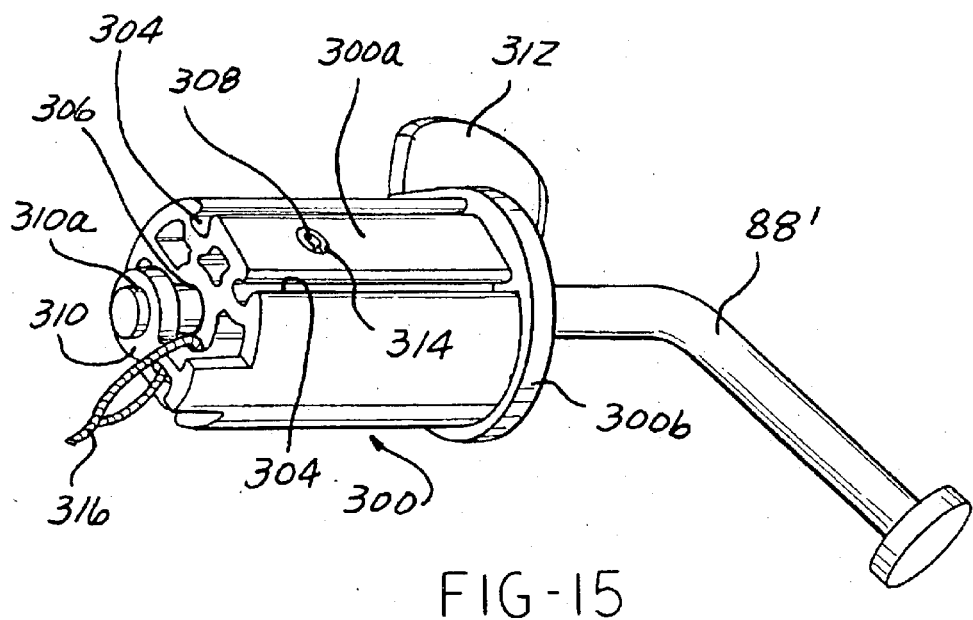
FIG. 15 is a perspective view of a plug and male member used in the embodiment of FIG. 14.

An alternate embodiment of a taut rendering means for the upper portion of the net member 18' is shown in FIGS. 14 and 15, wherein either and/or both of the upper corners of the load retaining barrier have a male projection 88' attached to an end plug 300 which is slidingly received in the end of the support beam 168'. In the embodiment shown in FIG. 14, the support beam 168' is teardrop shaped in external configuration and has a track 180 extending along its outer surface, similar to that shown in the embodiment of FIGS. 9, 12 and 13. A pair of short, parallel stiffener ribs 302 are formed integrally with the support beam 168' and extend along the longitudinal axis thereof. A longitudinal slot 304 is formed through the wall of the support beam 168' adjacent the end thereof, and is preferably located between the stiffener ribs.

The end plug 300 is preferably formed from a plastic material and may be formed by any suitable method, such as injection molding. As best seen in FIG. 15, the end plug 300 has a barrel portion 300a of the proper size and shape to fit within the end of the support beam 168', two parallel grooves 304 extending therealong and matching the geometry of the interior ribs 302 of the beam. A central hole 306 extends along the longitudinal axis of the end plug 300 and a locking hole 308 is formed transversely through the barrel portion to intersect the central hole 306. A retaining post 310 extends from one end of the barrel 300a and has a hole 310a aligned with the central hole 306 of the barrel.

An end cap portion 300b projects radiantly outward from the barrel 300a at the end opposite the retaining post 310 to provide a smooth, finished appearance when the end plug 300 is inserted into the end of the beam. A grip tab 312 extends from the end cap portion 300b.

A pin 314 passes through the locking hole 308 in the barrel 300a and through a correspondingly positioned hole in the male projection 88' to hold the male projection in engagement with the end cap 300. The pin 314 projects outwardly past the surface of the barrel 300a on one side thereof and through the slot 304 in the support beam 168' (see FIG. 14), thereby retaining the end cap/male projection assembly in engagement with the support beam but allowing sliding movement of the end cap relative to the beam. The length of the slot 304 limits the amount of axial movement of the end cap 300 relative to the support beam. An elastic cord 316 has a loop formed at an end thereof, and the loop encircles the retaining post 310. The innermost end of the male projection 88' passes through the hole 310a in the retaining post 310 to prevent the loop from slipping off of the post 310.

In a preferred embodiment of the invention, both ends of the support beam 168' have end caps 300 and male projections 88' as described above and the elastic cord 316 engages the retaining posts 310 of both end caps. When unstretched, the elastic cord 316 is shorter than the length of the support beam 168' so that when the elastic cord 316 is engaged with both of the end caps 300 the cord is stretched and pulls inwardly on the two end cap/male projection assemblies.

The overall length of the support beam 168' is such that one or both of the end caps 300 must be pulled outwardly with respect to the support beam 168' in order to engage the male projections 88' with their mating female coupling members. The elastic cord 316 thus maintains the support beam 168' in tension, thereby maintaining the attached netting member in a taut condition and suppressing any tendency of the support beam to rattle.

The barrier net 10''' shown in FIG. 9 has a taut rendering means associated with the lower support beam 170 comprising at least one strap 136 having an upper end 138 attached to an over-center lever mechanism 190' (described in detail hereinbelow) disposed on the lower support beam 170. A lower end 140 of the strap is attached to the cargo floor 40 via any suitable attachment means, such as, for example, a single bar tension lock 164 and a snaphook 166. The tension lock 164 may be utilized to shorten the strap 136 and thereby draw the lower support beam 170 downwardly until the netting member 10''' is taut. It is to be understood that this strap shortening means may comprise any suitable means. Any number of straps 136 may be used as desired and/or necessitated by a particular end use, but in the preferred embodiment two straps 136 are used.

Figure 10:
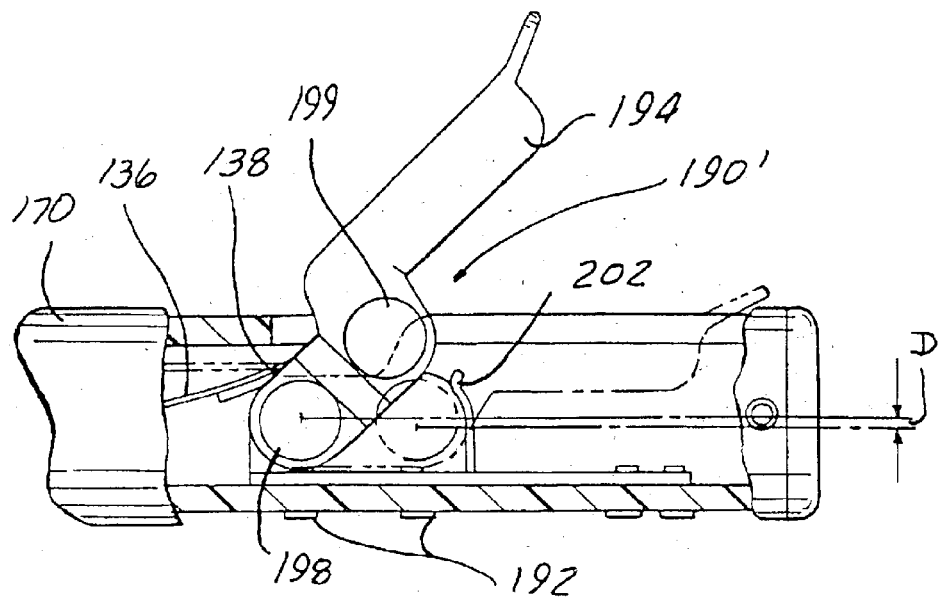
FIG. 10 is an enlarged, partially cutaway cross sectional view taken on line 10—10 of FIG. 9.

As seen in FIG. 10, lever mechanism 190' is substantially identical in overall configuration as that shown in FIG. 12 discussed above, except that the strap end 138 is attached to the clevis pin 199 so that as locking arm 194 is moved to the closed position (shown in phantom lines in FIG. 10), strap 136 is drawn tight, thereby securing lower support beam 170 and netting member 18' to the floor of the vehicle and rendering the bottom of netting member 18' taut.

Figure 13:
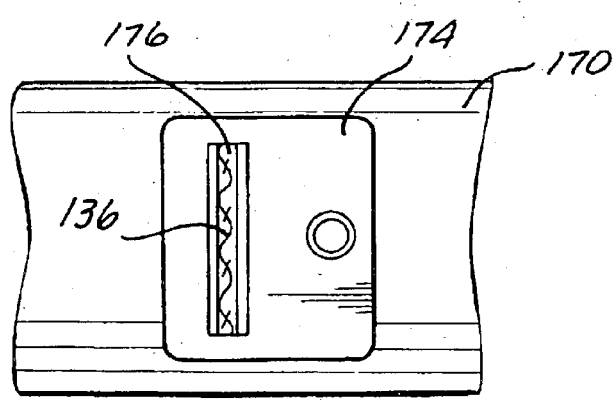
FIG. 13 is an enlarged bottom view as seen generally along line 13—13 of FIG. 9.

Referring now to FIG. 13, each of the holes in the bottom of lower beam 170 through which the straps 136 pass is fitted with a plastic grommet 174. The grommet 174 defines an inlet slot 176 having smooth surfaces to help prevent cutting or fraying of the strap 136 passing therethrough.

Figure 16:
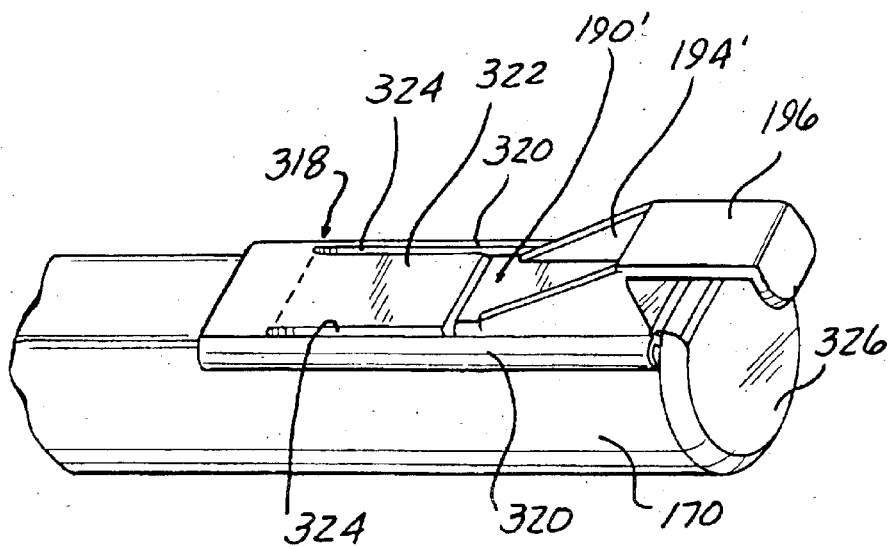
FIG. 16 is a partial perspective view of an alternative means for attaching and tautening the lower end of the net.

An alternative embodiment of a taut rendering means for the lower portion of the net member 18' is shown in FIG. 16. A lever mechanism 190' is structurally and functionally similar to that shown in FIG. 10, but the locking arm 194' has a grip tab 196 extending past the end of the support beam 170 so that it may easily be gripped and actuated. A cover 318, preferably formed on a plastic or hard rubber material, is fitted into a window in the support beam 170 through which the locking arm 194' extends. The cover 318 protects and hides from view the portion of the lever mechanism 190' located within the support beam 170. The cover 318 comprises two parallel rails 320 which engage the edges of the support beam defining the window, and a flap portion 322 extending between the rails and separated therefrom by slits 324. The flap 322 portion is flexible so that it may bend upwardly to permit the locking arm 194' to pivot to its open position. An end cap 326 is preferably formed from a plastic material and fits into the end of the support beam to provide a neat, finished appearance.

Figure 17:
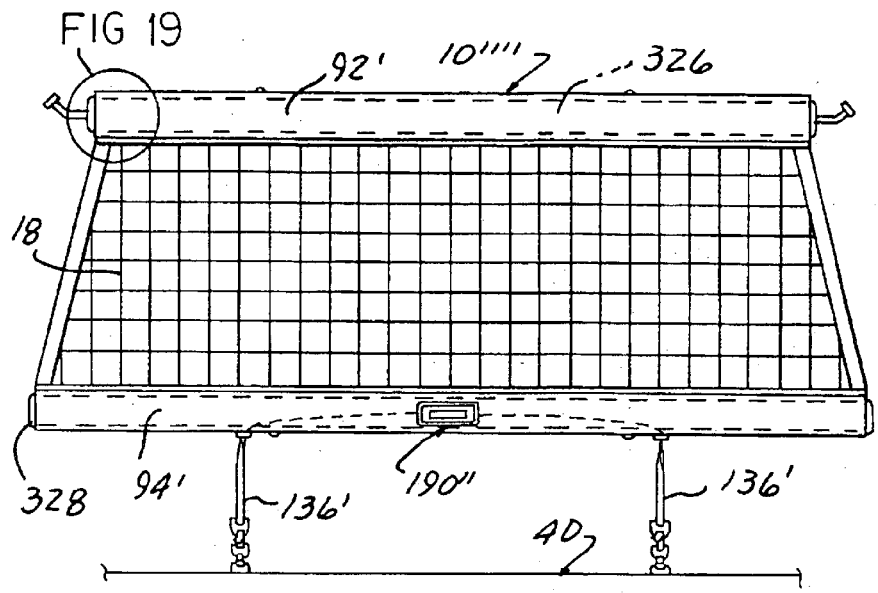
FIG. 17 is a yet another embodiment of a restraint net according to the present invention.

Referring now to FIG. 17, a further alternate embodiment of the barrier net is designated generally as 10''''. Upper and lower sleeves 92',94' are attached to the top and bottom of netting member 18', which may be substantially similar in construction and dimensions to any of the netting member embodiments described hereinabove. The sleeves 92',94' are securely attached to the netting member 18' and in the preferred embodiment are formed from polyester or nylon web strap, similar to the sleeves described hereinabove in relation to the embodiments of FIGS. 1, 2 and 6.

As best seen in FIG. 18, upper and lower support tubes 326,328 extend through the upper and lower sleeves respectively. Upper and lower support tubes 326,328 are circular in cross section and are preferably formed of aluminum or aluminum alloy to provide high strength while being light in weight. To prevent slippage between the tubes and their respective sleeves, one or more aligned holes 327 may be formed through the sleeves and tubes, and push-in fasteners 329 inserted therethrough.

Figure 19:
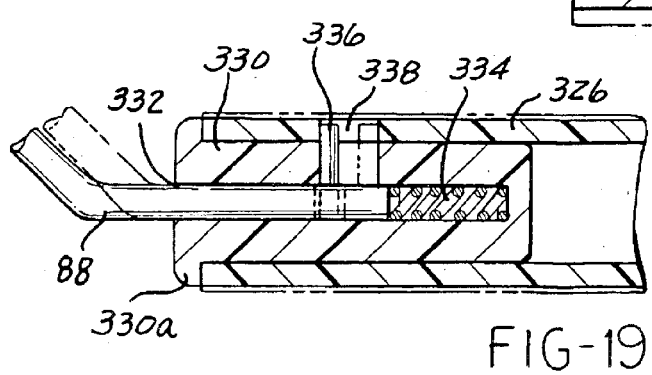
FIG. 19 is a detail view of the upper attachment means of the net of FIG. 17.

As seen in FIG. 19, each end of the upper support tube 326 is fitted with a plastic plug 330 which is retained in the end of the tube by a adhesive or mechanical fasteners. A flange 330a extends radially outward at the end of the plug 330 and covers the end of the tube. A blind hole 332 extends inwardly from the outer end of the plug 330 along the axial center line thereof and houses a coil spring 334. A male projection 88 similar to that disclosed in relation to the above-described embodiments is slidingly received in the hole 332. A stop pin 336 is received in a hole drilled transversely through the male projection 88 and extends through a slot 338 formed in both the plug 330 and the wall of the tube 326.

In this embodiment of the attachment means for the upper portion of the net, a male projection 88 at a first end of the upper tube 326 (which may be spring loaded, as shown in FIG. 19, or simply fixed to the tube) is inserted into a female coupling member attached to the vehicle interior, and a spring-loaded male member 88 at the opposite end of the tube is urged inwardly against the force of the coil spring 334 to permit the male projection to be inserted into a second female coupling member. The coil spring 334 is partially compressed when the restraint net is in the installed condition shown in FIG. 17, so that the upper support tube 326 is maintained in compression and is securely retained between the female coupling members on opposite sides of the vehicle.

Figures 20, 21:
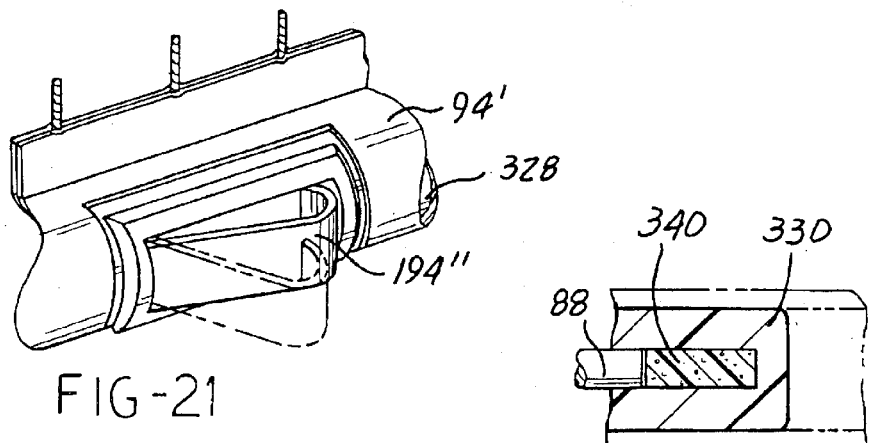
FIG. 20 is a detail view showing an alternative upper attachment means.
FIG. 21 is a detail of a centrally located lever mechanism as used in the net according to FIG. 17.

As seen in FIG. 20, the coil spring may be replaced by a quantity of compressible material 340 such as expanded foam or rubber. This is a simple and inexpensive alternative to the coil spring and eliminates the possibility that the spring will rattle when the vehicle is in motion.

Referring again to FIG. 17, the lower support tube 328 has taut rendering means comprising two straps 136' having upper ends attached to the support tube and lower ends attached to the cargo floor 40 in a manner similar to that described hereinabove in relation to the embodiment of FIG. 9. In FIG. 17, the straps 136' pass through holes formed in the bottom of the lower sleeve 94' and the lower support tube 328 and extend inwardly to engage an over-center lever mechanism 190'' located between the two straps at the approximate center of the lower tube. The lever mechanism 190'' is substantially identical to that shown in FIG. 10, except that both straps 136' are engaged therewith so that actuation of the locking arm 194'' acts to pull on both straps simultaneously, thereby shortening the straps and drawing the barrier net tight. This embodiment of the lower net taut rendering means has the advantage of requiring only a single lever actuation to tighten the net. As seen in FIG. 21, a hole is formed through the lower sleeve and lower support tube so that the lever mechanism may be mounted inside the lower tube and the handle may be accessed through the sleeve. It is also possible for the two straps 136' to be engaged with and tightened by separate lever mechanisms located inboard from the ends of the lower support tube 328.

FIG. 22 depicts yet another alternative tautening mechanism wherein the lower portion of the netting member 18' is sewn or otherwise attached to a lower sleeve 94' containing a lower support beam 328. Upper ends of the straps 342 pass around the lower sleeve 94' and support tube 328, and are sewn securely into loops 342a. The lower end of each strap 342 engages a length adjustment mechanism 344 having a J-hook 346 disposed at its lower end for engagement for an anchor fitting (not shown) secured to the floor of the cargo area. The length adjustment mechanism 344 further comprises a lever mechanism 190''' generally similar in configuration and operation to that disclosed and FIG. 12. The J-hook 346 is attached to locking arm 194''' so that as the locking arm is moved to the closed position, the J-hook is drawn upwardly, thereby reducing the overall length of the strap 342 and attached length adjustment mechanism 344. The lower end of the strap 342 is threaded through a tension lock 348 formed integrally with the length adjustment mechanism 344 to provide for precise adjustment of the strap length.

To install the barrier net in a vehicle, the upper end of the net is first secured to the vehicle using any of the various embodiments of the upper attachment means disclosed hereinabove. Then, with the lever arm 194''' of each length adjusting mechanism 344 in the open position, the J-hooks 346 are engaged with the anchor fittings on the vehicle floor. The free end of the strap 342 is then pulled upward through the tension lock 348 until the strap is snug. When the lever arm 194''' is moved to the closed position, the strap 342 is shortened further to draw the strap and the netting member 18' to a taut condition.

The FIG. 22 embodiment of the invention has several advantages over the other embodiments utilizing shortenable straps as the tautening means. This lower beam 328 is a simple, cylindrical tube with no additional machining or mechanical fittings required. The strap attachment to the sleeve and tube is very simple, and consequently the overall assembly is less expensive to produce.

With any of the embodiments or alternates discussed hereinabove, it is to be understood that any of the attaching means, as well as any suitable alternate means able to restrain predetermined, specified loads, may be used interchangeably at any of the attachment areas (upper and/or lower area of a rear seat, upper and/or lower area of front seat 134, a cargo area floor, behind the rear and/or front seats, interior trim panels, etc.) and/or in any suitable attachment location. For each of the attaching means, any suitable alternate may be used in light of the following: it is preferred that the attaching means be individually engineered (size, shape, configuration, material (it is to be understood that this is what is meant by the term "engineered plastic" as used herein), process for making, location and attachment means within the vehicle, etc.), dependent upon, for example, their respective locations within the motor vehicle, to meet specified load forces generated in a specific vehicle during a specified impact situation.

For example, one characteristic to be considered during such engineering is the momentum of stowage which would be generated during an impact situation—this momentum would vary, depending upon the initial, pre-impact location of the stowage. As such, this is a characteristic which is considered when determining desired load bearing capabilities of attaching means.

With the net of the present invention as depicted in FIGS. 1, 4 and 9, if the stowage weighs between about 10 Kg and about 100 Kg, it should be restrained during frontal impacts up to about 50 km/h, with approximate maximum deflection of the net being about 300 mm or less. However, it is to be understood that these embodiments may also function equally well as a "dog net" (to prevent pets from entering the operator's and/or passenger area) attached behind either the first and/or second row of seats, with no specified restraint characteristics being necessary.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A barrier net apparatus for a vehicle having a cargo area, a passenger compartment, an interior roof, windows, a belt line, an open space extending transversely between the cargo area and the passenger compartment, the barrier net comprising:

a netting member extending across the open space and having a top, a bottom and two opposed sides, the netting member adapted to restrain stowage within the cargo area from entering the passenger compartment, wherein the netting member is generally rectangular and has four corners;

means for attaching the netting member to the cargo area, wherein the attaching means comprises:

means for attaching the netting member top to the cargo area; and means for attaching the netting member bottom to the cargo area;

wherein at least one of the netting member top attaching means and the netting member bottom attaching means are removable, and further wherein there is a netting member-to-cargo area attaching means disposed at each of the four corners, the two upper corners being adjacent the interior roof and above the window, and the two lower corners being located at the belt line, wherein the attaching means comprises matingly engageable coupling members, one coupling member being a male projection disposed at each netting member corner, and the other coupling member being a female portion disposed at the respective motor vehicle location; and means for rendering the netting member taut, wherein the taut rendering means is disposed at the top and bottom of the netting member, the taut rendering means comprising:

two sleeves, one attached to the netting member top, and the other attached to the netting member bottom;

two multiple-strand, tightly wound energy absorbing metal wire cords, each cord having opposed ends, each cord longitudinally extending within one of the sleeves; and four spring loaded tension apparatuses, each tension apparatus operatively attached at one end to a cord end, and at the other end to the male projection.

2. The barrier net apparatus as defined in claim 1 wherein the taut rendering means further comprises:

a guide member extending longitudinally through each of the sleeves, each guide member having a generally tubular outer wall, at least one radially inwardly projecting positioning web integrally formed with the outer wall, and an inner housing integrally formed with the at least one positioning web, the inner housing adapted to position both the spring loaded tension apparatuses and the energy absorbing cords.

3. The barrier net apparatus as defined in claim 1 wherein the netting member top attaching means comprises:

matingly engageable coupling members, one coupling member being a male projection disposed at each of the opposed netting member upper corners, and the other coupling member being a female portion disposed at the respective adjacent interior roof location.

4. The barrier net apparatus as defined in claim 1 wherein the netting member bottom attaching means comprises:

at least one strap having two ends, one end of the strap being attached to the bottom of the netting member, the other end of the strap being attached to the vehicle floor; and means for tightening the at least one strap.

5. The barrier net apparatus as defined in claim 4 wherein there are two straps, and wherein the tightening means comprises:

an upper support beam having two opposed ends and attached to the netting member top;

a lower support beam having two opposed ends and attached to the netting member bottom; and an over-center lever mechanism attached to each opposed end of the lower support beam, the lever having a locking arm, the locking arm being operatively attached to the strap;

wherein when the locking arms of each of the levers are in the closed position, the netting member is rendered taut.

6. The barrier net apparatus as defined in claim 5 wherein there is an over-center lever mechanism attached to each of the upper support beam opposed ends.

7. A barrier net apparatus for use with a motor vehicle having a cargo area; a passenger compartment; an interior roof; windows; a belt line; and at least one of an open space extending transversely to the vehicle between the cargo area and the passenger compartment above the belt line, and an open space extending transversely to the vehicle between a first row of seats and a second row of seats above the belt line; the barrier net apparatus comprising:

a netting member having a top, a bottom and two opposed sides;

first and second sleeves attached to and extending along the top and bottom of the netting member respectively;

first and second energy absorbing cords extending longitudinally within the first and second sleeves respectively; and means for attaching opposite ends of the cord to the vehicle.

8. A motor vehicle having a cargo area, a passenger compartment, an interior roof, windows, a belt line, an open space extending transversely between the cargo area and the passenger compartment, and a load retention net, the load retention net comprising:

a netting member extending across the open space and having a top, a bottom and two opposed sides, the netting member adapted to restrain stowage within the cargo area from entering the passenger compartment, wherein the netting member is generally rectangular and has four corners;

means for attaching the netting member to the cargo area, wherein the attaching means comprises:

means for attaching the netting member top to the cargo area; and means for attaching the netting member bottom to the cargo area;

wherein at least one of the netting member top attaching means and the netting member bottom attaching means are removable, and further wherein there is a netting member-to-cargo area attaching means disposed at each of the four corners, the two upper corners being adjacent the interior roof and above the window, and the two lower corners being located at the belt line, wherein the attaching means comprises matingly engageable coupling members, one coupling member being a male projection disposed at each netting member corner, and the other coupling member being a female portion disposed at the respective motor vehicle location; and means for rendering the netting member taut, wherein the taut rendering means is disposed at the top and bottom of the netting member, the taut rendering means comprising:

two sleeve members, one attached to the netting member top, and the other attached to the netting member bottom;

two multiple-strand, tightly wound energy absorbing metal wire cords, each cord having opposed ends, each cord longitudinally extending within a sleeve member; and four spring loaded tension apparatuses, each tension apparatus operatively attached at one end to a cord end, and at the other end to the male projection.

9. The motor vehicle as defined in claim 8 wherein the taut rendering means further comprises:

a guide member extending longitudinally through each of the sleeves;

at least one radially inwardly projecting positioning web integrally formed with the guide member; and an inner housing integrally formed with the at least one positioning web, the inner housing adapted to position both the spring loaded tension apparatuses and the energy absorbing cords.

10. A load retaining barrier net apparatus for use with a motor vehicle having a cargo area, a passenger compartment, an interior roof, windows, a belt line, and at least one of an open space extending transversely to the vehicle between the cargo area and the passenger compartment above the belt line, and an open space extending transversely to the vehicle between a first row of seats and a second row of seats above the belt line, the barrier net apparatus including a netting member having a top, a bottom, and two opposed sides, such that means for removably attaching the top of the netting member to the vehicle and the bottom of the netting member to the vehicle with the netting member extending across the at least one open space adjacent the belt line is characterized in that:

a first rigid member adjacent the top of the net has a first coupling member and a second coupling member located at opposite ends, and the first and second coupling members have limited movement relative to one another while the first rigid member maintains a minimum spacing between the first and second coupling members with respect to one another;

a second rigid member adjacent the bottom of the net has at least a third coupling member and a fourth coupling member associated therewith; and means for moving at least one of the first and second coupling members relative to the first rigid member.

11. The barrier net of claim 10, wherein the third and fourth coupling members are moveable with respect to the netting member.

12. The barrier net apparatus of claim 10, wherein the first rigid member has a track formed in an outer surface thereof and extending along a longitudinal axis thereof, and at least one of the top and bottom of the netting member has a bead extending along an edge thereof engageable within the track to secure the first rigid member to the netting member.

13. A load retaining barrier net apparatus for use with a motor vehicle having a cargo area, a passenger compartment, an interior roof, windows, a belt line, and at least one of an open space extending transversely to the vehicle between the cargo area and the passenger compartment above the belt line, and an open space extending transversely to the vehicle between a first row of seats and a second row of seats above the belt line, the barrier net apparatus including a netting member having a top, a bottom, and two opposed sides, such that means for removably attaching the top of the netting member to the vehicle and the bottom of the netting member to the vehicle with the netting member extending across the at least one open space adjacent the belt line is characterized in that:

a first rigid member adjacent the top of the net has a first coupling member and a second coupling member located at opposite ends, and the first and second coupling members have limited movement relative to one another while the first rigid member maintains a minimum spacing between the first and second coupling members with respect to one another;

a second rigid member adjacent the bottom of the net has at least a third coupling member and a fourth coupling member associated therewith; and at least one sleeve attached to and extending along at least one of the top and bottom of the netting member, and the corresponding rigid member positioned within the sleeve.

14. A load retaining barrier net apparatus for use with a motor vehicle having a cargo area, a passenger compartment, an interior roof, windows, a belt line, and at least one of an open space extending transversely to the vehicle between the cargo area and the passenger compartment above the belt line, and an open space extending transversely to the vehicle between a first row of seats and a second row of seats above the belt line, the barrier net apparatus including a netting member having a top, a bottom, and two opposed sides, such that means for removably attaching the top of the netting member to the vehicle and the bottom of the netting member to the vehicle with the netting member extending across the at least one open space adjacent the belt line is characterized in that:

a first rigid member adjacent the top of the net has a first coupling member and a second coupling member located at opposite ends, and the first and second coupling members have limited movement relative to one another while the first rigid member maintains a minimum spacing between the first and second coupling members with respect to one another;

a second rigid member adjacent the bottom of the net has at least a third coupling member and a fourth coupling member associated therewith; and biasing means, operably disposed between the first rigid member and each of the first and second coupling members, for urging each of the first and second coupling members along a longitudinal axis of the first rigid member.

15. The barrier net apparatus of claim 14, wherein the biasing means comprises a coil spring urging the coupling member inwardly with respect to the first rigid member.

16. The barrier net apparatus of claim 14, wherein the biasing means comprises an elastic cord urging the coupling member inwardly with respect to the rigid member.

17. The barrier net apparatus of claim 14, wherein the biasing means comprises a coil spring urging the coupling member outwardly with respect to the first rigid member.

18. The barrier net apparatus of claim 14, wherein the biasing means comprises a compressible material urging the coupling member outwardly with respect to the first rigid member.

19. The barrier net apparatus of claim 10 further comprising:

an over-center lever mechanism including a locking arm operatively attached to the coupling member for moving the coupling member in response to movement of the locking arm.

20. The barrier net apparatus of claim 10, wherein at least one of the third and fourth coupling members further comprises:

at least one strap engageable with respect to the second rigid member; and means for moving the at least one strap with respect to the second rigid member.

21. The barrier net apparatus of claim 20, wherein the at least one strap further comprises:

first and second over-center lever mechanisms attached to each opposed end of the second rigid member, each of the over-center lever mechanisms having a locking arm, each locking arm being operatively attached to the at least one strap, wherein when the locking arms are in a closed position, the netting member is rendered taut.

22. The barrier net apparatus of claim 20, wherein the strap moving means further comprises:

at least one over-center lever mechanism having a locking arm operatively attached to the strap for retracting the strap in response to movement of the locking arm to a closed position.

23. The barrier net apparatus of claim 22, wherein the at least one over-center lever mechanism is disposed adjacent an end of the second rigid member.

24. The barrier net apparatus of claim 22, wherein the at least one strap further comprises:

first and second straps engaged with respect to the second rigid member at spaced apart locations, wherein the at least one over-center lever mechanism is attached to the second rigid member at a position between the first and second straps, and the at least one over-center lever mechanism is operatively attached to the first and the second straps so that actuation of the locking arm retracts both the first and second straps simultaneously.

25. The barrier net apparatus of claim 22, wherein the at least one over-center lever mechanism is engaged with the strap at a point below the second rigid member and above the vehicle floor.

26. The barrier net apparatus of claim 22, wherein the at least one over-center lever mechanism is disposed substantially centered with respect to the second rigid member.

27. The barrier net apparatus of claim 22, wherein the at least one over-center lever mechanism is spaced from the second rigid member.

28. The barrier net apparatus of claim 22, wherein the over-center lever mechanism further comprises:

a base positionable interior of the corresponding rigid member, wherein the locking arm is engageable with the base and projects through a window defined by the corresponding rigid member.

29. A load retaining barrier net apparatus for use with a motor vehicle having a cargo area, a passenger compartment, an interior roof, windows, a belt line, and at least one of an open space extending transversely to the vehicle between the cargo area and the passenger compartment above the belt line, and an open space extending transversely to the vehicle between a first row of seats and a second row of seats above the belt line, the barrier net apparatus including a netting member having a top, a bottom, and two opposed sides, such that means for removably attaching the top of the netting member to the vehicle and the bottom of the netting member to the vehicle with the netting member extending across the at least one open space adjacent the belt line is characterized in that:

a first rigid member adjacent the top of the net has a first coupling member and a second coupling member located at opposite ends, and the first and second coupling members have limited movement relative to one another while the first rigid member maintains a minimum spacing between the first and second coupling members with respect to one another;

a second rigid member adjacent the bottom of the net has at least a third coupling member and a fourth coupling member associated therewith; and at least one of the top and bottom attaching means includes at least one energy absorbing cord extending longitudinally within one of the rigid members, opposite ends of the cord operably attached to corresponding coupling members.

30. The barrier net apparatus of claim 29, wherein the energy absorbing cord comprises at least two strands.

31. The barrier net apparatus of claim 29, wherein the energy absorbing cord is formed from metal wire.

32. A load retaining barrier net apparatus for use with a motor vehicle having a cargo area, a passenger compartment, an interior roof, windows, a belt line, and at least one of an open space extending transversely to the vehicle between the cargo area and the passenger compartment above the belt line, and an open space extending transversely to the vehicle between a first row of seats and a second row of seats above the belt line, the barrier net apparatus including a netting member having a top, a bottom, and two opposed sides, such that means for removably attaching the top of the netting member to the vehicle and the bottom of the netting member to the vehicle with the netting member extending across the at least one open space adjacent the belt line is characterized in that:

a first rigid member adjacent the top of the net has a first coupling member and a second coupling member located at opposite ends, and the first and second coupling members have limited movement relative to one another while the first rigid member maintains a minimum spacing between the first and second coupling members with respect to one another;

a second rigid member adjacent the bottom of the net has at least a third coupling member and a fourth coupling member associated therewith; and at least one of the rigid members including a guide member extending longitudinally through a sleeve, at least one radially inwardly projecting positioning web integrally formed with the guide member, and an inner housing integrally formed with the at least one positioning web, the inner housing for positioning a spring loaded tension apparatus and a cord.

33. The barrier net apparatus of claim 10, wherein the netting member comprises a lightweight, resilient and strong synthetic material selected from the group consisting of coated polyesters, multifilament polypropylenes, and nylons.

34. The barrier net apparatus of claim 10, wherein the netting member comprises a flexibly rigid, extruded polymeric material.

35. A load retaining barrier net apparatus for use with a motor vehicle having a cargo area, a passenger compartment, an interior roof, windows, a belt line, and at least one of an open space extending transversely to the vehicle between the cargo area and the passenger compartment above the belt line, and an open space extending transversely to the vehicle between a first row of seats and a second row of seats above the belt line, the barrier net apparatus including a netting member having a top, a bottom, and two opposed sides, such that means for removably attaching the top of the netting member to the vehicle and the bottom of the netting member to the vehicle with the netting member extending across the at least one open space adjacent the belt line is characterized in that:

a first rigid member adjacent the top of the net has a first coupling member and a second coupling member located at opposite ends, and the first and second coupling members have limited movement relative to one another while the first rigid member maintains a minimum spacing between the first and second coupling members with respect to one another;

a second rigid member adjacent the bottom of the net has at least a third coupling member and a fourth coupling member associated therewith;

the netting member including two sleeves, one sleeve attached to the netting member top, and the other attached to the netting member bottom, the rigid members individually positionable in the respective sleeves;

each of the top and bottom attaching means located at corresponding corners of the netting member, the two upper corners being adjacent the interior roof and above the window, and the two lower corners being located at the belt line, wherein each of the top and bottom attaching means includes matingly engageable coupling members, one coupling member being a male projection disposed at each netting member corner, and the other coupling member being a female portion disposed at the respective motor vehicle location; and two multiple-strand, tightly wound energy absorbing metal wire cords, each cord having opposed ends, each cord longitudinally extending within one of the sleeves and the corresponding rigid members, and four spring loaded tension apparatuses, each tension apparatus operatively attached at one end to a cord end, and at the other end to the corresponding male projection.

36. A load retaining barrier net apparatus for use with a motor vehicle having a cargo area, a passenger compartment, an interior roof, windows, a belt line, and at least one of an open space extending transversely to the vehicle between the cargo area and the passenger compartment above the belt line, and an open space extending transversely to the vehicle between a first row of seats and a second row of seats above the belt line, the barrier net apparatus including a netting member having a top, a bottom, and two opposed sides, such that means for removably attaching the top of the netting member to the vehicle and the bottom of the netting member to the vehicle with the netting member extending across the at least one open space adjacent the belt line is characterized in that:

a first rigid member adjacent the top of the net has a first coupling member and a second coupling member located at opposite ends, and the first and second coupling members have limited movement relative to one another while the first rigid member maintains a minimum spacing between the first and second coupling members with respect to one another;

a second rigid member adjacent the bottom of the net has at least a third coupling member and a fourth coupling member associated therewith;

each of the first and second coupling members include first and second pairs of matingly engageable coupling members disposed at opposite ends of the first rigid member, each pair of coupling members including a male projection secured to the respective end of the first rigid member and a female portion attachable to the motor vehicle at a corresponding location and for receiving the respective male projection, and each of the third and fourth coupling members include first and second straps having respective first ends operably engaged with respect to the second rigid member and respective second ends attachable to a floor of the cargo area, and means for retracting the first and second straps for urging the second rigid member toward the floor.

37. The barrier net apparatus of claim 10, wherein the netting member has a mesh size between about 1 mm and about 2 mm.

38. The barrier net apparatus of claim 10, wherein at least one of the top and bottom attaching means further comprises:

a plug slidingly receivable with respect to at least one of the rigid members, wherein the plug includes at least one groove and the at least one of the rigid members includes at least one rib extending toward an interior of the at least one of the rigid members, wherein the at least one rib is positionable in the at least one groove when the at least one rigid member slidably receives the plug.

39. The barrier net apparatus of claim 10, wherein the at least one of the top and bottom attaching means further comprises:

a pin engageable with one said coupling member and extending at least partially transverse with respect to a longitudinal axis of a corresponding rigid member; and the corresponding rigid member having an aperture wherein the pin is positionable in the aperture and moveable between at least two positions to define limits of movement of the one said coupling member with respect to the corresponding rigid member.

* * * * *